United States Patent [19]

Eicher et al.

[11] Patent Number: 4,509,552
[45] Date of Patent: Apr. 9, 1985

[54] GAS GUN FOR DETERMINING THE LIQUID LEVEL OF A WELL

[75] Inventors: Dean A. Eicher, Bellaire; Fount E. McKee, Houston, both of Tex.

[73] Assignee: Delta-X Corporation, Houston, Tex.

[21] Appl. No.: 486,128

[22] Filed: Apr. 18, 1983

[51] Int. Cl.³ .................. F16K 37/00; G01L 19/02
[52] U.S. Cl. ........................... 137/557; 73/290 V; 137/558; 367/908
[58] Field of Search ............ 73/290 R; 137/558, 557; 222/64; 367/908

[56] References Cited

U.S. PATENT DOCUMENTS

| | | | |
|---|---|---|---|
| 2,560,911 | 7/1951 | Wolf | 367/908 X |
| 2,764,645 | 9/1956 | Smith | 73/290 R X |
| 3,611,981 | 10/1971 | Warncke | 137/557 X |
| 4,014,213 | 3/1977 | Parquet | 73/290 R |
| 4,203,467 | 5/1980 | Cardi | 137/557 |
| 4,355,658 | 10/1982 | Snyder | 137/557 |
| 4,480,468 | 11/1984 | Sinha | 73/290 V |

FOREIGN PATENT DOCUMENTS

WO83/02001 6/1983 PCT Int'l Appl. .............. 73/290 V

*Primary Examiner*—Daniel M. Yasich
*Attorney, Agent, or Firm*—Fulbright & Jaworski

[57] ABSTRACT

A gas gun for producing pressure pulses for measuring the liquid level in a well. A body is adapted to be connected to a well and includes first and second chambers which are interconnected by a passageway. Pressure pulses flowing between the chambers creates a pressure pulse for transmittal to a well which is measured by a microphone measuring pressure variations. A piston actuated valve opens and closes the passageway between the first and second chambers. A firing valve transmits the higher pressure in one of the chambers to the back of the piston for closing the valve, and after one of the chambers is pressurized, exhausts the pressure from the back of the pressurized piston for opening the valve and creating a pressure pulse between the chambers. A spring biases the piston actuated valve to the closed position. The piston actuated valve, when closed, includes a first face portion exposed to one chamber and a second face portion exposed to the second chamber each of which is smaller in area than the back side of the piston and the gas gun can be actuated with a high pressure gas in either chamber. One of the chambers includes means for gas charging and means for releasing gas from the chamber. The gas gun may be fired from a remote location.

17 Claims, 4 Drawing Figures

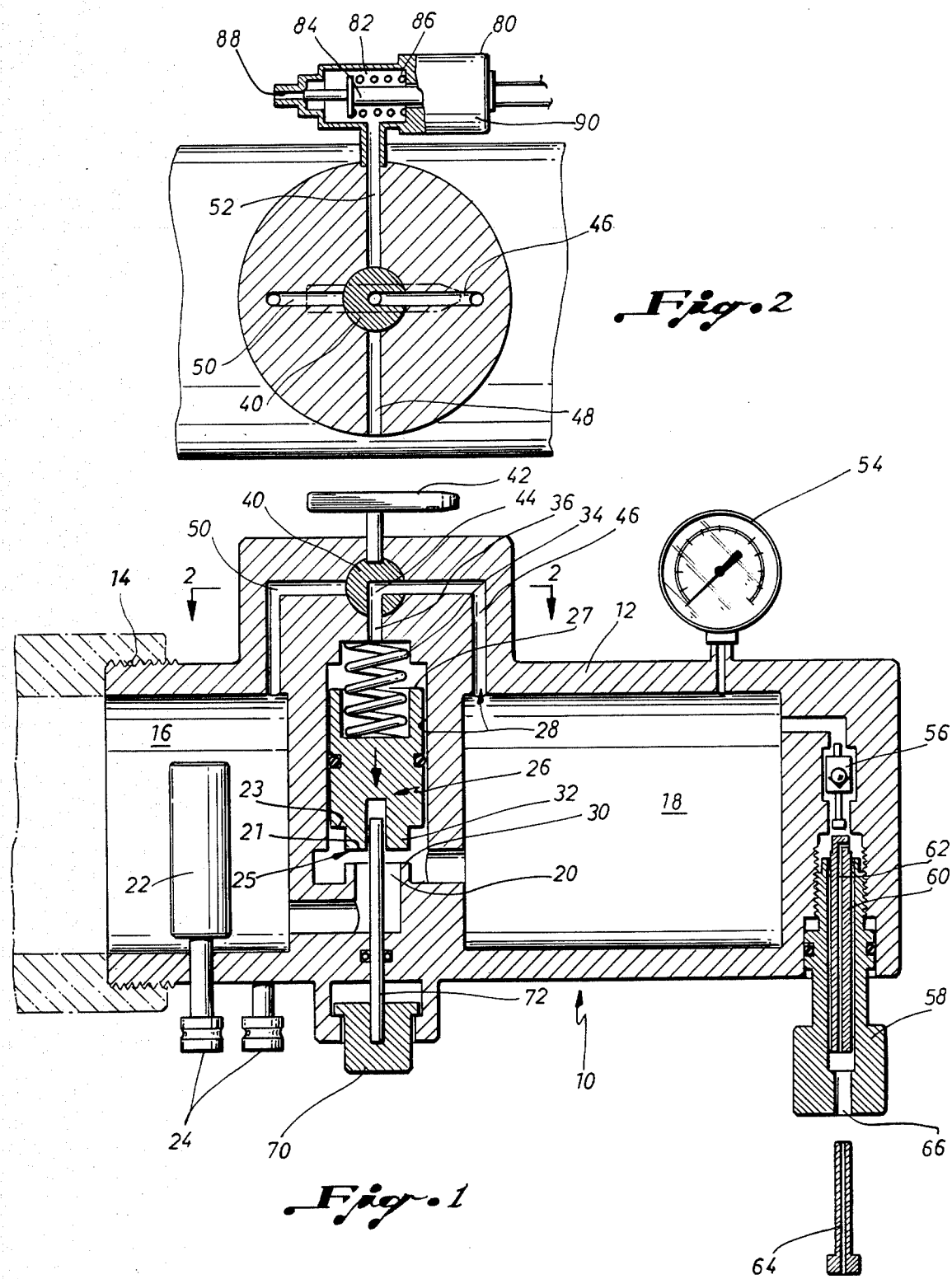

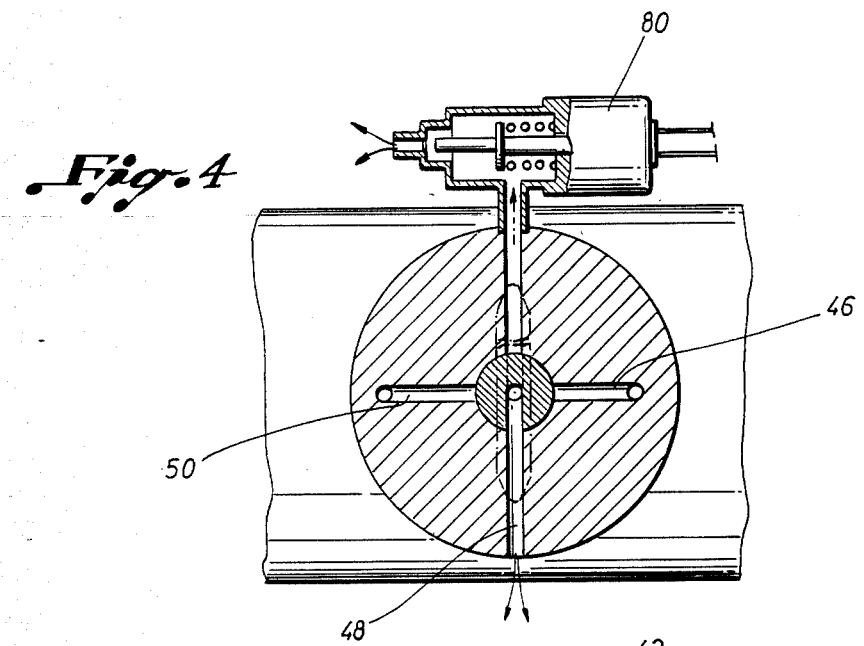
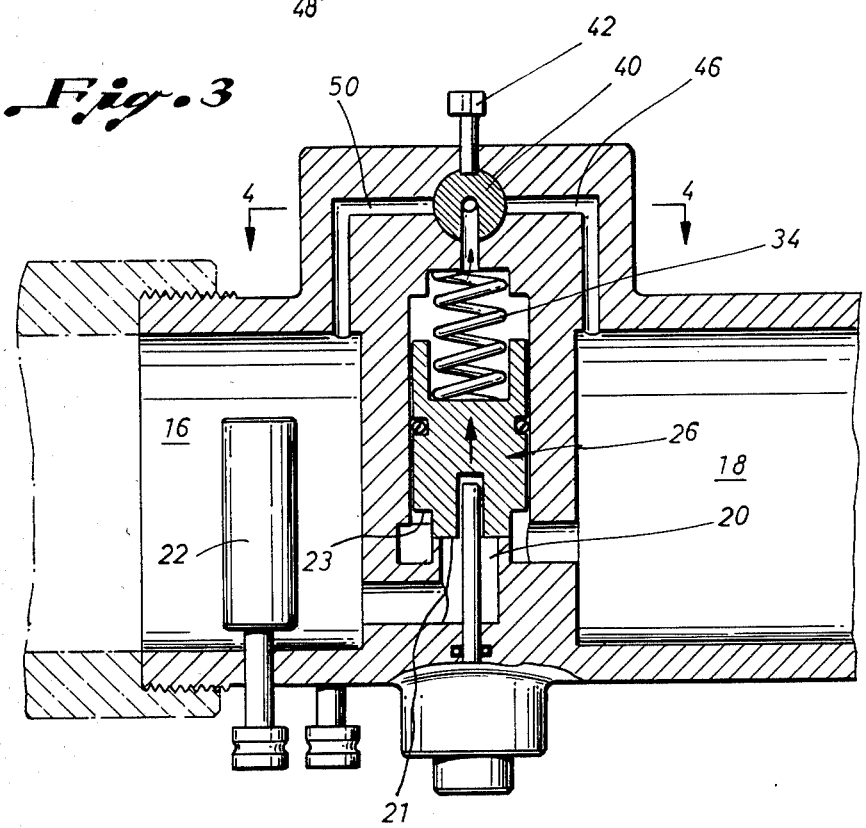

GAS GUN FOR DETERMINING THE LIQUID LEVEL OF A WELL

BACKGROUND OF THE INVENTION

It is well known to utilize a pressure pulse in a well for measuring the liquid level of the well.

The present invention is directed to an improved gas gun for producing a pressure pulse in a well and measuring the pressure variations in the well which is an indication of the liquid level in the well. The improved gas gun may utilize a gas charge or may use the pressure of the well gas, if sufficient, to provide the pressure pulses for measurement. In addition, the gas gun of the present invention may be remotely operated if desired.

SUMMARY

The present invention is directed to a gas gun for producing pressure pulses for measuring liquid level in a well. The gun comprises a body adapted to be connected to the well and the body includes first and second chambers interconnected by a passageway whereby a pressure pulse flowing between the chambers creates a pressure pulse for transmittal to the well. Means are provided in the body for measuring pressure variations in the pulses which is an indication of the liquid depth in the well. A piston actuated valve is provided for opening and closing the passageway between the first and second chambers. Means are provided for transmitting the higher pressure in one of the chambers to the piston for closing the valve and means are provided for exhausting the pressure from the pressurized piston for opening the valve and creating a pressure pulse between the chambers. Preferably, the piston actuated valve is biased, such as by spring means, to a closed position.

Another object of the present invention is the provision of means connected to one of the chambers for charging the chamber with gas. In addition, it is preferable to provide means connected to said one chamber for releasing gas from the one chamber.

Still a further object of the present invention is the provision wherein the transmitting means and the exhausting means include a rotary valve for alternately connecting the piston to pressure in one of the chambers and to the atmosphere.

Still a further object of the present invention is the provision wherein the pressure actuated valve, when closed, includes a first face portion exposed to one chamber and a second face portion exposed to the second chamber whereby either chamber may provide the pressure pulse. The first and second face portions are each smaller in area than the back side of the piston.

Yet a further object of the present invention is wherein the gas charging means and the gas releasing means includes a check valve which allows the passage of gas into the chamber but normally prevents the release of gas from the chamber. A longitudinally movable plunger is adapted to engage the check valve for opening the check valve. The plunger includes a passageway for passage of gas into or out of the chamber and means are provided for longitudinally moving said plunger into and out of engagement with the check valve. The means for moving the plunger may include a fitting threadably connected to the body and enclosing and abutting the plunger whereby inward threaded movement of the fitting longitudinally moves the plunger. In addition, the plunger may be engaged by a gas nozzle adapted to telescopically engage the fitting for longitudinally moving the plunger.

Still a further object of the present invention is the provision of remotely actuating the valve by providing means, for releasing the pressure behind the piston actuated valve, including a solenoid actuated valve connected to the atmosphere.

Yet a still further object of the present invention is the provision of a manually actuated means for opening the piston actuated valve for equalizing the pressure in the two chambers.

Other and further objects, features and advantages will be apparent from the following description of a presently preferred embodiment of the invention, given for the purpose of disclosure and taken in conjunction with the accompanying drawings.

BRIEF DESCRIPTION OF THE DRAWINGS

FIG. 1 is a schematic elevational view, in cross section, of the valve of the present invention being charged, FIG. 2 is a cross-sectional view taken along the line 2—2 of FIG. 1, FIG. 3 is a fragmentary schematic elevational view, in cross section, of the valve of the present invention being fired, and FIG. 4 is a cross-sectional view taken along the line 4—4 of FIG. 3.

DESCRIPTION OF THE PREFERRED EMBODIMENT

Referring now to the drawings, the reference numeral 10 generally indicates the gas gun of the present invention and includes a body 12 having means for connecting the body to a well, such as threads 14. The body includes a first chamber 16 and a second chamber 18 and the chamber 16 and 18 are interconnected by a passageway 20 whereby a pressure pulse flowing between the chambers creates a pressure pulse for transmitting to the well. Means are provided in the body 12 such as a microphone 22 which may be a piezo-electric crystal for measuring pressure variations in the well. Electrical terminals 24 are connected to the microphone 22 for attachment to a recorder for recording the pressure variations in any created pulses which is an indication of the liquid level in a connected well.

A piston actuated valve including a piston 26 and a valve element 32 is provided sealingly moving in a cylinder 28 for seating on a valve seat 30 by the valve element 32 for opening and closing the passageway 20. When the valve element 32 is seated on the valve seat 30, as best seen in FIG. 3, the flow of gases between the chambers 16 and 18 is prevented. When the piston 26 and its valve element 32 is moved away from the valve seat 30, as best seen in FIG. 1, high pressure gas in one of the chambers 16 and 18 is free to flow through the passageway 20 to the other chamber. Biasing means such as a spring 34 is provided acting to move the piston 26 against the valve seat 30. The piston 26 is also exposed to two pressurized forces acting upon its front and back face. The piston 26 includes a back face 27 exposed to pressure in the port 36 and the front face of the piston 26, generally indicated by the reference numeral 25, is exposed to the pressure in the chambers 16 and 18.

Basically, the gun 10 is operated by having a higher pressure in one of the chambers 16 and 18 and transmitting that higher pressure to the port 36 at the back face 27 of the piston 26 for seating the valve element 32 and thereafter exhausting the pressure from the port 36 opening the valve seat 30 and creating a pressure pulse between the chambers. The transmitting and exhausting means may include a firing valve generally indicated by the reference numeral 40 which may be a ball valve actuated by a handle 42 and which includes a passageway 44, one end of which remains in communication at all times with the port 36, and the other end of which is selectively connectible to ports 46, 48, 50 or 52. If the chamber 18 is the high pressure chamber, the handle 42 of the valve 40 is rotated to bring the ports 36 and 46 into communication thereby balancing the pressure on the front face 25 and back face 27 of the piston 26 whereby the biasing spring 34 seats the element 32. When the pressure in the chamber 18 is satisfactorily charged, the handle 42 is rotated to connect the port 36 to the port 48 which is connected to the atmosphere. This releases the pressure from the port 36 and the back face 27 of the piston 26 to allow the high pressure acting on the front side 25 of the piston 26 to retract the valve element 32 from seat 30 and create a pressure pulse moving from chamber 18 to the chamber 16.

A pressure gauge 54 may be provided connected to the chamber 18 for measuring and indicating the pressure therein. The chamber 18 may be suitably charged with a compressed gas or vented to the atmosphere as required. Thus, a check valve 56 is provided in communication between the atmosphere and the chamber 18. The check valve 56 normally prevents gas from flowing out of the chamber 18 into the atmosphere but allows the admission of gas into the chamber 18. An inlet fitting 58 is provided which is threadably connected to the body 12 and telescopically and longitudinally carries a plunger 60 having a passageway 62 therethrough. The inlet fitting 58 may be threaded to a depth sufficient to carry and cause the freely floating inlet fitting plunger 60 to depress the check valve 56 for manually venting gas pressure from the chamber 18. For charging the chamber 18, a source of compressed gas, such as nitrogen or carbon dioxide, may be connected to a charging fitting 64 which is seatingly inserted into the opening 66 of the fitting 58. The charging fitting 64 when inserted into the passageway 66 depresses the plunger 60 which in turn opens the check valve 56. When compressed gas from a gas source is released into the fitting 64, the gas flows through the passage 62 in the plunger 60, through the check valve 56, and into the chamber 18. Preferably, the various gas passages into the chamber 18 are sufficiently small so that the gas flows slowly enough into the chamber 18 to read the desired pressure as indicated on the pressure gauge 54 as the chamber 18 is being charged.

In operation for actuating the gas gun 10 with a gas charge in the chamber 18, the firing valve 40 is positioned with its passageway 44 in communication between the port 36 leading to the backside 27 of the piston 26 and the port 46 leading to the chamber 18 as best seen in FIG. 1. If the pressure on the back face 27 and the front face 25 of the piston 26 are equal, the spring biasing means 34 will seat the valve element 32 on the valve seat 30. Or, if the piston 26 is in the open position, when gas is injected into the chamber 18, it will reach both the back face 27 and the front face 25 of the piston 26 and the spring 34 will then produce a net force on the piston 26 moving it onto the valve seat 30. With the piston 26 seated on the valve seat 30, the chamber 18 may be filled with a gas charge to the desired pressure.

The gas gun 10 is fired by moving the firing valve 40 to the fire position by connecting the port 36 with the port 48 and thus with the atmosphere thereby communicating the pressure on the back face 27 of the piston 26 to the atmosphere. The small volume of gas in the back face of the piston 26 quickly exits through the port 36. With the loss in pressure in the chamber 28 on the backside of the piston 26, the gas in the chamber 18 exerts a force on the frontside of the piston 26 sufficient to move the piston 26 off of the seat 30 and compress the spring 34. Chamber 18 now freely exhausts through the passageway 20 into the chamber 16 and to the connected well bore. By merely returning the firing valve 40 to place the port 36 in communication with the chamber 18, the valve seat 32 is seated, and the chamber 18 can be repressurized and is ready for an additional firing. That is, by balancing the pressures on the front face 25 and the back face 27 of the piston 26, the spring 34 again biases the piston 26 to its closed position against the valve seat 30 and the chamber 18 can be recharged.

The gas gun 10 can also be operated from a well that has a high gas pressure by charging the chamber 16 from the well. In this event an external source of compressed gas is not required. To operate in the well gas firing mode, the firing valve 40 is rotated to place the port 36 in communication with the port 50 and thus with the high pressure from the well in the chamber 16. With the passageway 44 communicating between the ports 36 and 50, the well gas present in chamber 16 reaches both the front 25 and the rear face 27 of the piston 26 whereby the spring 34 moves the piston 26 to a closed position against the valve seat 30. The valve element 32 then blocks off flow between the high pressure chamber 16 and the chamber 18. However, the chamber 18 must be exhausted and closed off prior off to firing the gas gun 10. Thus, the inlet fitting 58 is screwed into the body 12 carrying the plunger 60 which engages and opens the check valve 56 for venting off the now closed chamber 18. After venting, the inlet fitting 58 is threadably retracted to allow the check valve 56 to close.

The gas gun 10 is now fired by rotating the manually actuated handle 42 and the valve 40 to rotate the passageway 44 into communication between the port 36 and the port 48 which is connected to the atmosphere. Again, the small volume of gas behind the piston 26 is vented to atmosphere. With the loss in pressure in the cylinder 28 behind the piston 26, the gas pressure in the passageway 20 acts against the piston 26 to move the piston off of the seat 30 and compress the spring 34. The higher pressure well gas now quickly flows from the chamber 16 through the passageway 20 and into the chamber 18 creating the desired pressure pulse for transmittal to the well bore. By again rotating the firing valve 40 to place its passageway 44 in communication between the port 36 and the well gas port 50, the pressure forces on the piston 26 are again balanced and the biasing spring 34 returns the piston valve to its seated position on the valve seat 30. Screwing in the inlet fitting 58 allows the pressurized gas in the chamber 18 to be vented through the check valve 56 and to the atmosphere. The gas gun 10 is ready for another firing by unscrewing the inlet fitting 58 which allows the check valve 56 to again prevent the flow of gas out of the chamber 18.

It is to be noted that the front face 25 of the piston valve element 32 includes a first face 21 which is exposed to the pressure in the chamber 16 when the piston valve element 32 is closed and includes a second face portion 23 which is exposed to the pressure in the chamber 18 when the piston valve element 32 is closed. Each of the face portions 21 and 23 are smaller than the back face 27 of the piston 26 thereby insuring that the biasing spring 34 may close the piston 26 when the pressure is equalized across the piston 26. In addition, by having the separate face portions 21 and 23 exposed separately to the chambers 16 and 18 when the valve 26 is closed, the gas gun 10 can be operated by high pressure in either the chamber 16 or 18.

If desired, a pushbutton knob 70 may be provided to actuate a push rod 72 which sealingly extends through the housing 12 for engaging the piston 26 for unseating the valve element 32 manually for equalizing the pressure between the chambers 16 and 18, such as when disconnecting the gun 10 from the well.

If desired, the gas gun 10 may be fired from a remote location which is particularly advantageous in bad weather. In this event, a solenoid valve 80 is provided having a chamber 82 which is normally closed by a valve stem 84. The stem 84 is biased to a closed position by a spring 86 preventing communication of the chamber 82 with the exit port 88. A solenoid coil 90 is provided for attracting the stem 84 and opening the chamber 82 to the vent port 88. In firing the gun 10 from a remote location, the valve 80 is connected by the chamber 82 to the port 52. After the gun is readied for firing, from either chamber 16 or 18 as previously described, the firing valve 40 is turned to the remote fire position to place the port 36 in communication with the port 52. This action results in a small pressure drop in the port 36 due to the increased volume of the connected porting, but the pressure change is not large enough to cause a movement of the piston 26. When the solenoid 80 is energized from a remote location, the valve stem 84 retracts from the vent port 88 and opens the chamber 82 to the vent port 88 and atmosphere causing the gun to fire. That is, the decrease of pressure on the back face 27 of the piston 26 causes the high pressure in either of the chambers 16 or 18 to act on the piston 26 to open the piston valve and create a pressure pulse between the chambers 16 and 18.

The present invention, therefore, is well adapted to carry out the objects and attain the ends and advantages mentioned as well as others inherent therein. While a presently preferred embodiment of the invention is given for the purpose of disclosure, numerous chambers in the details of construction and arrangement of parts will readily suggest themselves to those skilled in the art and which are encompassed within the spirit of the invention and the scope of the appended claims.

What is claimed is:

1. A gas gun for producing pressure pulses for measuring the liquid level in a well comprising,
    a body adapted to be connected to a well,
    said body including first and second chambers interconnected by an intermediate passageway whereby a pressure pulse flowing between the chambers creates a pressure pulse for transmittal to a well, one of said chambers adapted to be connected to the well and one of said chambers adapted to be connected to a pressure source,
    means in the body measuring pressure variations,
    a piston actuated valve coupled to means for selectively opening and closing the passageway between the first and second chambers,
    means for transmitting the higher pressure in one of the chambers to the piston for resiliently closing the valve, and
    means for exhausting the pressure from the pressurized piston to the atmosphere for opening the valve and creating a pressure pulse between the chambers.

2. The apparatus of claim 1 including,
    spring means for biasing the piston actuated valve to a closed position.

3. The apparatus of claim 1 including,
    means connected to one of the chambers for gas charging said one chamber.

4. The apparatus of claim 3 including,
    means connected to said one chamber for releasing gas from said one chamber.

5. The apparatus of claim 1 wherein the transmitting means and the exhausting means includes,
    a valve for alternately connecting the piston to pressure in one of the chambers and to the atmosphere.

6. The apparatus of claim 1 wherein the piston actuated valve, when closed, includes,
    a first face portion exposed to one chamber, and a second face portion exposed to the second chamber.

7. The apparatus of claim 6 wherein said first and second face portions are each smaller in area than the backside of the piston.

8. The apparatus of claim 4 wherein the gas charging means and the gas releasing means includes,
    a check valve allowing the passage of gas into the chamber but normally preventing the release of gas from the chamber,
    a longitudinally movable plunger adapted to engage said check valve for opening said check valve,
    said plunger including a passageway for passage of gas into or out of said chamber, and
    means for longitudinally moving said plunger into and out of engagement with the check valve.

9. The apparatus of claim 8 wherein the means for moving said plunger includes,
    a fitting threadably connected to the body and enclosing and abutting said plunger whereby inward threaded movement of the fitting longitudinally moves the plunger.

10. The apparatus of claim 9 including,
    a gas nozzle adapted to telescopically engage the fitting and engage the plunger for longitudinally moving the plunger.

11. The apparatus of claim 4 wherein said releasing means includes,
    a solenoid actuated valve connected to the body in communication with the piston.

12. The apparatus of claim 1 including,
    a manually actuated means for opening said piston actuated valve for equalizing the pressure in the two chambers.

13. A gas gun for producing pressure pulses for measuring the liquid level in a well comprising,
    a body adapted to be connected to a well,
    said body including first and second chambers interconnected by a passageway whereby a pressure pulse flowing between the chambers creates a pressure pulse for transmittal to a well, one of said chambers to be connected to the well and one of the chambers adapted to be connected to a pressure source, means on the body for measuring pressure variations, a piston actuated valve coupled to means for selectively opening and closing the passageway between the first and second chambers, said piston including a back and a face, biasing means for biasing the piston actuated valve to the closed position, valve means for alternately connecting the pressure in one of the chambers to the back of the piston valve and to the atmosphere.

14. The apparatus of claim 13 wherein the face of the piston actuated valve, when closed, includes, a first face portion exposed to one chamber, and a second face portion exposed to the second chamber.

15. The apparatus of claim 14 including, means connected to one of the chambers for gas charging said one chamber.

16. The apparatus of claim 15 including, means connected to said one chamber for releasing gas from said one chamber.

17. The apparatus of claim 13 wherein said valve means alternately connects the back of the piston valve to either of the chambers and the atmosphere.

* * * * *